United States Patent [19]

Rapp

[11] 4,117,590
[45] Oct. 3, 1978

[54] WIRE LEAD AND SOLDER REMOVAL TOOL

[75] Inventor: Willard Emanuel Rapp, Princeton, N.J.

[73] Assignee: Western Electric Company, Inc., New York, N.Y.

[21] Appl. No.: 840,429

[22] Filed: Oct. 7, 1977

[51] Int. Cl.[2] .............................................. B25B 27/14
[52] U.S. Cl. ...................................... 29/764; 29/427; 228/119
[58] Field of Search ........................ 29/762, 764, 427; 140/123; 228/19

[56] References Cited

U.S. PATENT DOCUMENTS

| 1,608,350 | 11/1926 | Waller | 29/762 |
| 3,524,482 | 8/1970 | Church et al. | 140/149 |
| 3,866,846 | 2/1975 | Dorsey | 29/764 |
| 3,990,863 | 11/1976 | Palmer | 29/764 |

Primary Examiner—Carl E. Hall
Attorney, Agent, or Firm—A. S. Rosen

[57] ABSTRACT

A power-operated tool functions to remove wire leads and solder from terminals e.g., terminals which include two bent lugs, without any application of heat to the leads or terminals. The tool includes a number of scrapers, each having a scraping edge. With the scraping edges initially maintained forced apart, the scrapers are positioned axially forwardly along a terminal, so as to locate the scraping edges beneath one or more soldered wire leads. The tool is then energized, causing the scrapers to be moved axially rearwardly along the terminal, and simultaneously causing the scraping edges to be moved generally radially inwardly toward one another so as to engage firmly a plurality of surfaces of the terminal. The axially moving scraping edges serve to scrape the wire lead and solder axially off the terminal. Two embodiments of the tool are disclosed.

21 Claims, 16 Drawing Figures

WIRE LEAD AND SOLDER REMOVAL TOOL

BACKGROUND OF THE INVENTION

1. Field of the Invention

The invention relates to tools for removing wire leads from terminals and, more particularly, to tools for removing wire leads from a number of terminals on a common base member, while also removing all solder from the terminals, so that the common base member may be reused.

2. Description of the Prior Art

In the art of removing wire leads from terminals, it is known to provide power-operated tools which function first to unwrap a wire lead from a terminal, such as a round post, about which the wire lead has previously been wrapped, and then to lift the loose wire lead axially off the terminal. A typical wire lead removal tool of this type is disclosed in U.S. Pat. No. 3,524,482 to H. D. Church et al. Tools designed for removing wrapped wire leads by performing successive unwrapping and lifting operations are, however, ordinarily not suitable for the removal of soldered wire leads from terminals.

It is also known to apply sufficient heat to a soldered wire lead on a terminal, e.g., a flat terminal, to melt the solder, such that the wire lead may then readily be lifted, e.g., manually, from the terminal. The application of heat to the soldered wire lead is, however, considered disadvantageous in that the molten solder tends to emit noxious or otherwise objectionable fumes, as does any insulation on the wire lead, to the extent that such insulation may become charred.

Clearly, it would be advantageous to provide a simple, inexpensive and reliable, power-operated tool, capable of removing soldered wire leads from terminals, preferably without performing such heating operations as might generate noxious or otherwise objectionable fumes. Advantageously, such a tool should be adapted to operate on terminals which include irregular contours, as well as on flat terminals.

SUMMARY OF THE INVENTION

The invention contemplates a tool for removing at least one wire lead from a terminal simply, inexpensively and reliably, by utilizing a plurality of scrapers for scraping the wire lead or leads and all associated solder axially off the terminal. Each of the scrapers includes a scraping edge, and is so mounted that each scraping edge faces a scraping edge of an associated scraper. The means which mount the plurality of scrapers are adapted to move the scrapers linearly between an extended position of the scrapers and a withdrawn position of the scrapers. The tool also includes means, urging the facing scraping edges of the plurality of scrapers apart, and responsive to the plurality of scrapers moving into the extended position of the plurality of scrapers, for separating the facing scraping edges of the scrapers, such that the plurality of scrapers may readily be positioned axially along the terminal beyond one or more wire leads thereon. The tool further includes means, urging the facing scraping edges of the plurality of scrapers toward one another, and responsive to the plurality of scrapers moving away from the extended position of the plurality of scrapers, for so displacing the facing scraping edges of the scrapers toward one another so as to engage the scraping edges firmly with a plurality of surfaces of the terminal, which surfaces may have irregular contours, upon axial movement of the plurality of scrapers toward its withdrawn position during operation of the moving means, thereby scraping the wire lead or leads from the terminal. No solder-heating facilities are required in connection with the use of the tool of the invention.

DETAILED DESCRIPTION

Figures 1, 3A, 3B:
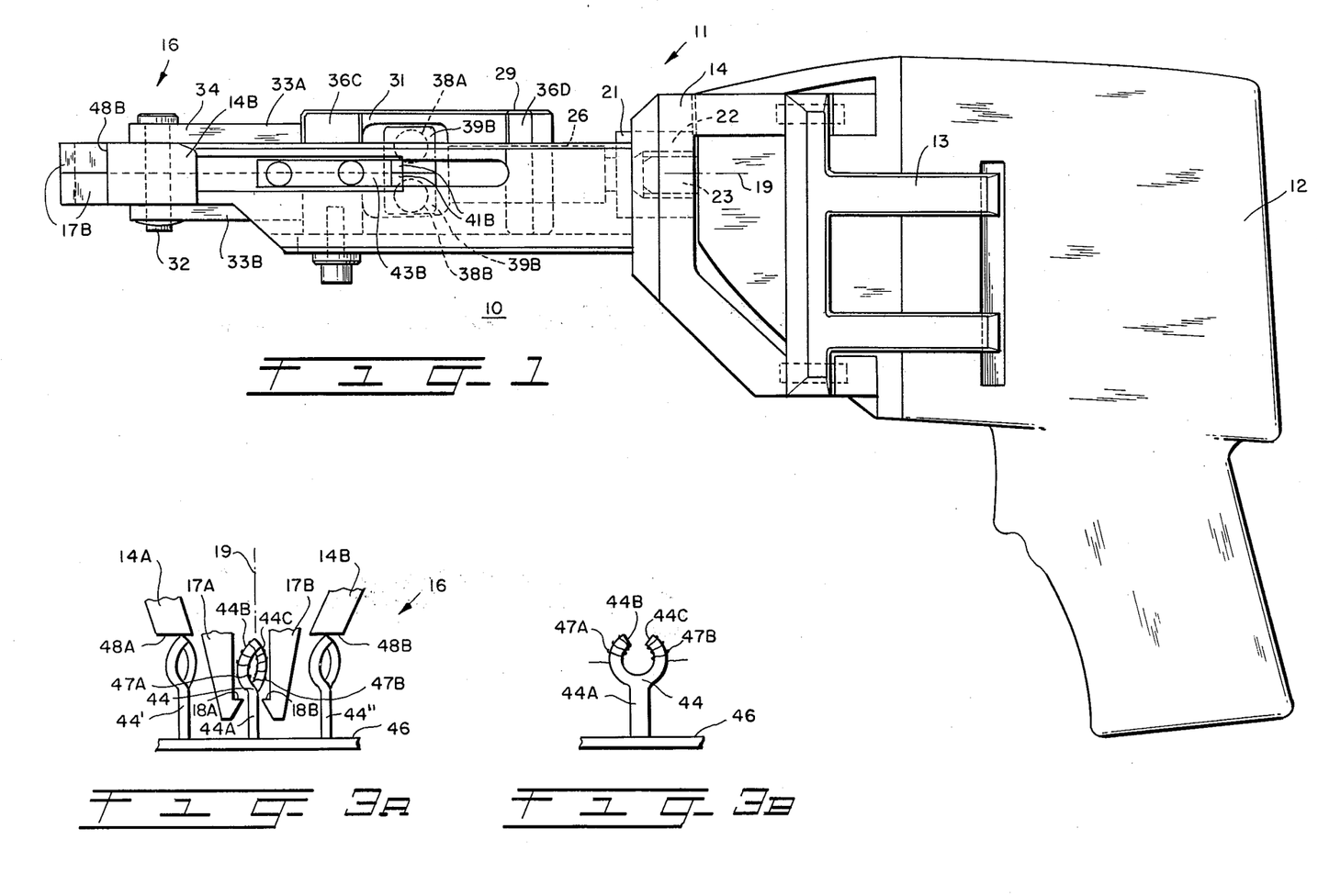
FIG. 1 of the drawing is a side elevational view of a power-operated, wire lead and solder removal tool which constitutes a first embodiment of the invention.
FIG. 3A is an enlarged illustration of a forward portion of the tool as depicted in FIG. 2, showing forward ends of a pair of scrapers and of two elements of a main frame member, and illustrating the removal of a pair of wire leads from one of a number of two lug terminals which project transversely from a common base member.
FIG. 3B is an enlarged side elevational view of the two lug terminal shown in FIG. 3A.
Figure 2:
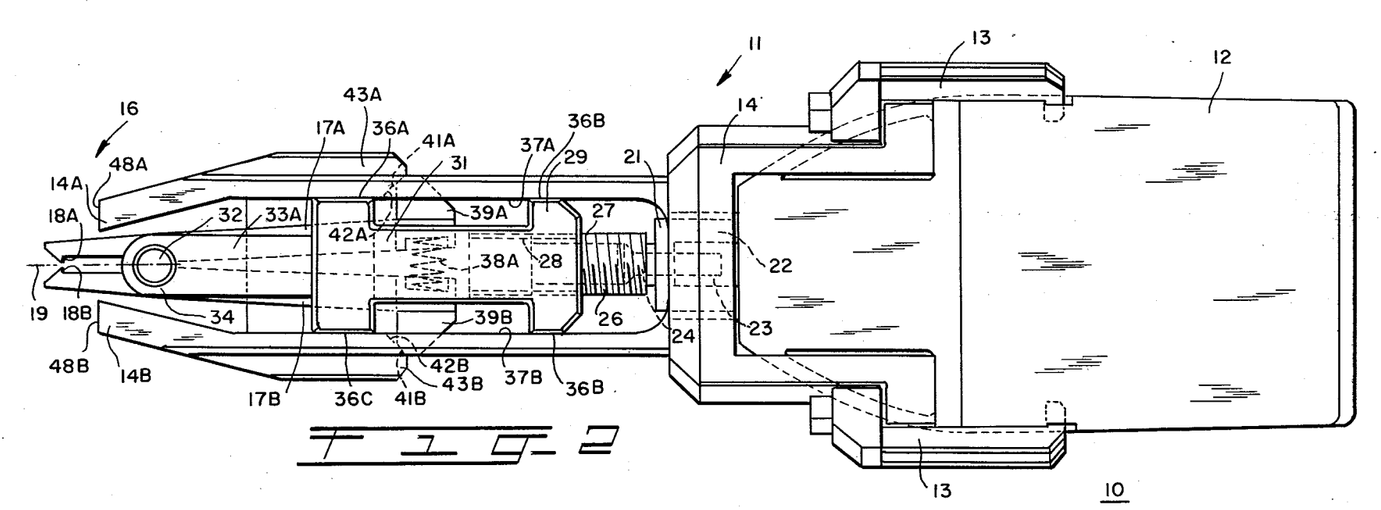
FIG. 2 is a plan view of the tool of FIG. 1, illustrating additional features of the tool.

Referring initially to FIGS. 1 and 2 of the drawing, a power-operated, wire lead and solder removal tool 10 constitutes a first embodiment of the invention. The tool 10 includes a frame structure 11 which may be adapted for attachment to a conventional drive mechanism, e.g., a power-operated drill 12, such as a Sears Model No.

315.10510, ⅜-inch portable drill or any other commercially-available, power-operated drill providing a reversible spindle rotation capability. Alternatively, the tool 10 may be integral with, or may otherwise be considered to include, the structure of the power-operated drill 12 or any other suitable rotary drive mechanism, with the tool 10 also including the frame structure 11 and various other elements, to be discussed hereinafter, which are supported by the frame structure 11.

The frame structure 11 of the tool 10 includes a number of mounting brackets 13,13 and a main frame member 14, the mounting brackets 13,13 serving to secure the main frame member 14 to the housing of the power-operated drill 12. The main frame member 14 extends axially forward, i.e., leftwardly in FIGS. 1 and 2, from the housing of the power-operated drill 12 to a front end 16 of the tool 10, terminating in a pair of spaced frame elements 14A and 14B (see also FIG. 3A) which surround two pairs of scrapers 17A and 17B. The two pairs of scrapers 17A and 17B, as will be discussed hereinafter, are mounted both for axial movement toward and away from the front end 16 of the tool 10 between the frame elements 14A and 14B, and for independent pivotal movement to permit the scrapers 17A and 17B to follow the irregular contours of two dissimilarly bent, terminal lugs.

Each of the scrapers 17A and 17B (FIGS. 2, 3A and 5) includes a scraping edge 18A or 18B. Each scraping edge 18A is located along a portion of a scraper 17A which faces generally radially inwardly toward a longitudinal axis 19 of the tool 10 and a cooperating scraping edge 18B of an associated scraper 17B.

Figure 4A:
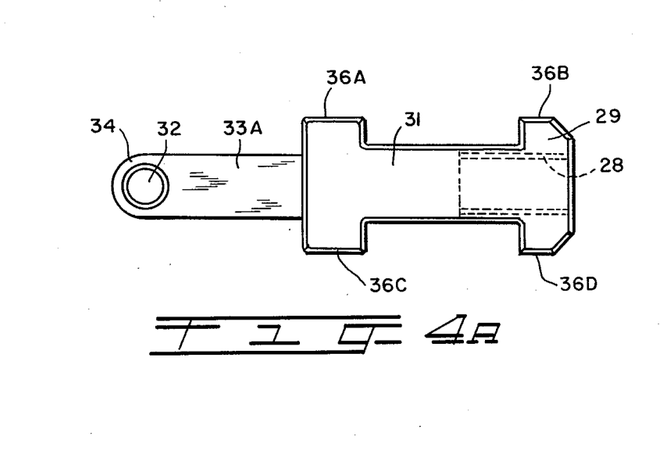
FIGS. 4A and 4B are plan views, respectively, of a scraper carrier and an adapter member, FIGS. 4A and 4B showing such two elements of the tool aligned axially in a relationship which the two elements would assume in the initial assembly of the tool, with FIG. 4A also showing a pivot pin associated with the scraper carrier, and with FIG. 4B also showing a forward portion of an associated, power-operated drill.
Figure 4B:
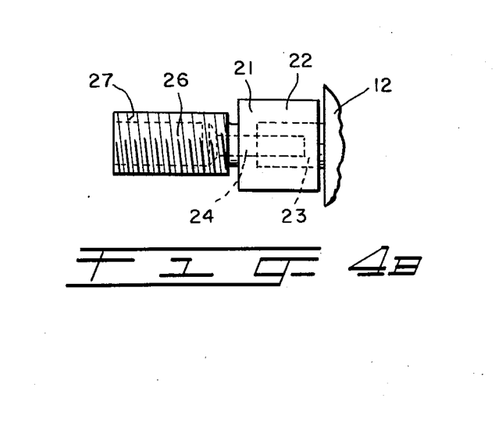

A mechanism for moving the two pairs of scrapers 17A and 17B axially of the tool 10, i.e., parallel to the longitudinal axis 19, will next be described. Such mechanism includes an adapter member 21 (FIG. 4B) having a rearward portion 22 which fits over a spindle 23 of the power-operated drill 12. The adapter member 21 is coupled to rotate with the spindle 23, e.g., by a lock screw 24 passing through the rearward portion 22 and into engagement with the spindle 23.

A forward portion 26 of the adapter member 21 includes an axially extending, externally threaded region 27, which mates with an internal threading 28 (FIG. 4A) extending axially within a rearward portion 29 of a scraper carrier 31. The two pairs of scrapers 17A and 17B (FIG. 5) are carried by, and independently pivotable about, a pivot pin 32 which passes through a pair of laterally spaced, axially extending bars 33A and 33B (FIGS. 1, 2 and 4A) which together constitute a forward portion 34 of the scraper carrier 31. The scraper carrier 31 includes a number of flat side surfaces 36A, 36B, 36C, 36D which are adapted to slide against one or the other of two fixed, flat, inner surfaces 37A and 37B (FIG. 2) of the main frame member 14. The scraper carrier 31 is constrained against rotation about the longitudinal axis 19 of the tool 10 by virtue of such sliding engagement between the various flat surfaces. Thus, upon rotation of the spindle 23 and the adapter member 21, the scraper carrier 31 and the pivot pin 32 will move linearly, advancing or retracting the two pairs of scrapers 17A and 17B along the longitudinal axis 19 of the tool 10, due to the threaded interconnection between the adapter member 21 and the scraper carrier 31. Rotation of the spindle 23 of the power-operated tool 11 in one direction will move the scrapers 17A and 17B toward a forward, extended position, while rotation of the spindle 23 in the opposite direction will move the scrapers 17A and 17B toward a rearward, withdrawn position.

Figure 5:
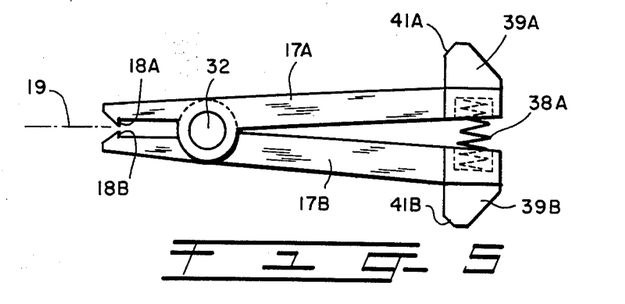
FIG. 5 is a plan view of the pair of scrapers partially depicted in FIG. 3, further illustrating certain features of, and the relationship between, the scrapers.

A compression spring 38A or 38B (FIGS. 1, 2 and 5) extends between each scraper 17A and each associated scraper 17B at an enlarged, rearward end 39A or 39B of the scraper 17A or 17B, biasing or urging the respective rearward scraper ends 39A and 39B apart. Since the biasing action occurs across the pivot pin 32 from the scraping edges 18A and 18B of the respective scrapers 17A and 17B, the springs 38A and 38B function to bias the facing, scraping edges 18A and 18B generally radially inwardly, i.e., with the facing, scraping edges 18A and 18B urged toward one another (FIG. 5).

The rearward end 39A or 39B of each scraper 17A or 17B includes a forward-facing, cam follower surface 41A or 41B. The cam follower surfaces 41A and 41B are aligned with associated camming surfaces 42A and 42B (FIG. 2) on respective camming members 43A and 43B constituted by rearwardly extending portions of the spaced frame elements 14A and 14B. Thus, upon forward movement of the scrapers 17A and 17B into their extended positions, the camming surfaces 42A and 42B will so operate upon the respective cam follower surfaces 41A and 41B as to force the rearward ends 39A and 39B of the associated scrapers 17A and 17B together against the bias of the springs 38A and 38B. As a result, the scraping edges 18A and 18B of the associated scrapers 17A and 17B will be forced apart in the extended positions of the scrapers 17A and 17B.

The operation of the tool 10 will next be described. The two pairs of scrapers 17A and 17B are initially taken to be in an extended position, i.e., with the scraper carrier 31 and the pivot pin 32, upon which the two pairs of scrapers 17A and 17B are independently mounted, extended forwardly along the longitudinal axis 19 of the tool 10, toward the left in FIGS. 1 and 2 of the drawing. The camming action of the camming surfaces 42A and 42B (FIG. 2) on the respective cam follower surfaces 41A and 41B of the scrapers 17A and 17B counteracts the outward biasing action of the springs 38A and 38B. Thus, the associated scraping edges 18A and 18B are maintained pivoted radially outwardly, away from one another. As a result, the tool 10 may readily be manipulated to position the two pairs of scrapers 17A and 17B axially along a terminal 44 (FIGS. 3A and 3B) projecting transversely from a base member 46, e.g., a connector block or terminal board, with the separated scraping edges 18A and 18B extending beyond one or more soldered wire leads, located on the terminal 44, to a flat portion 44A of the terminal 44 located beneath the wire lead or leads. The terminal 44 may include a pair of oppositely bent lugs 44B and 44C, to each of which is soldered a different one of two wire leads 47A and 47B. The frame elements 14A and 14B include respective, flat, forward-facing (as viewed in FIG. 2) surfaces 48A and 48B for each bearing axially against a rearward-facing surface of a different one of a pair of adjacent terminals 44' and 44" on the base member 46 as the scrapers 17A and 17B are placed over the terminal 44.

The power-operated drill 12 is now energized, in conventional manner, rotating the spindle 23 in a direction of rotation selected for rearward linear movement of the two pairs of scrapers 17A and 17B, i.e., movement toward the right in FIGS. 1 and 2 of the drawing, and upwardly in FIG. 3A of the drawing. As a result of such rotation of the spindle 23, the interaction between the external threading 27 on the rotating adapter member 21 and the internal threading 28 on the non-rotatable scraper carrier 31 causes a rearward linear movement of the scraper carrier 31, the pivot pin 32 and the scrapers 17A and 17B along the longitudinal axis 19 of the tool 10 toward a withdrawn position of the scrapers 17A and 17B.

The rearward movement of the two pairs of scrapers 17A and 17B initially causes the follower surfaces 41A and 41B (FIG. 5) on the respective rearward ends 39A and 39B of the scrapers 17A and 17B to be withdrawn from the respective camming surfaces 42A and 42B (FIG. 2) on the camming members 43A and 43B. Upon such withdrawal, the camming force, which has previously served to overcome the biasing action of the compression springs 38A and 38B, is removed from the rearward ends 39A and 39B of the respective scrapers 17A and 17B. Thus, the springs 38A and 38B cause the scrapers 17A and 17B to pivot about the pivot pin 32, such that the scraping edges 18A and 18B are displaced into contact with the flat portion 44A of the terminal 44 at a location along the terminal 44 still just beneath the wire leads 47A and 47B (FIG. 3A).

Continuing rearward movement of the two pairs of scrapers 17A and 17B, with continuing rotation of the spindle 23 of the power-operated drill 12, next causes the scraping edges 18A and 18B of the respective scrapers 17A and 17B to be drawn rearwardly along the two lug terminal 44 with the scraping edges 18A and 18B each firmly engaging a different surface portion of the terminal 44 due to the biasing action of the springs 38A and 38B. One pair of scraping edges 18A and 18B traverses the bent lug 44B of the terminal 44, scraping the lead 47A and the associated solder (not shown) cleanly off the lug 44B, while the other pair of scraping edges 18A and 18B acts similarly but independently upon the lead 47B of oppositely bent lug 44C. The independent, pivotal support of the two pairs of scrapers 17A and 17B on the pivot pin 32 permits the various scraping edges 18A and 18B to follow the dissimilar bends in the two lugs 44B and 44C during such scraping operations. The engagement of the forward-facing tool surfaces 48A and 48B with the rearward-facing surfaces of the adjacent terminals 44' and 44" is designed to prevent axial movement of the base member 46 and the terminal 44 during the axial scraping operation effected by the scrapers 17A and 17B.

The removed wire leads 47A and 47B and any associated solder may be allowed to fall free, or may be received in a suitable receptacle for collecting scrap material. The direction of rotation of the power-operated drill 12 may thereupon be reversed, causing reversed rotation of the spindle 23, and with it the adapter member 21. Thus, the scraper carrier 31 begins to move linearly forward along the longitudinal axis 19 due to the feeding action of the rotating, external threads 27 of the adapter member 21 upon the internally threaded region 28 of the non-rotatable scraper carrier 31. The forward linear movement of the scraper carrier 31 causes the pivot pin 32, and with it the two pairs of scrapers 17A and 17B, to advance toward the initial, extended position of the scrapers 17A and 17B.

As the scrapers 17A and 17B continue to move forward with continuing rotation of the spindle 23 of the power-operated drill 12, the cam follower surfaces 41A and 41B again come into engagement with the respective camming surfaces 42A and 42B on the camming members 43A and 43B. Continuing rotation of the spindle 23 thereupon provides both a continuation of the forward movement of the scrapers 17A and 17B and a pivotal, separating movement of the respective scraping edges 18A and 18B of each pair of associated scrapers 17A and 17B due to the camming action of the camming surfaces 42A and 42B overcoming the bias of the compression springs 38A and 38B. As the scrapers 17A and 17B again attain their extended positions, the associated scraping edges 18A and 18B are again pivoted into a fully separated condition, whereupon the power-operated drill 12 may be de-energized. The tool 10 may thereupon be employed in performing another wire lead removal operation on another terminal.

Figures 6, 7:
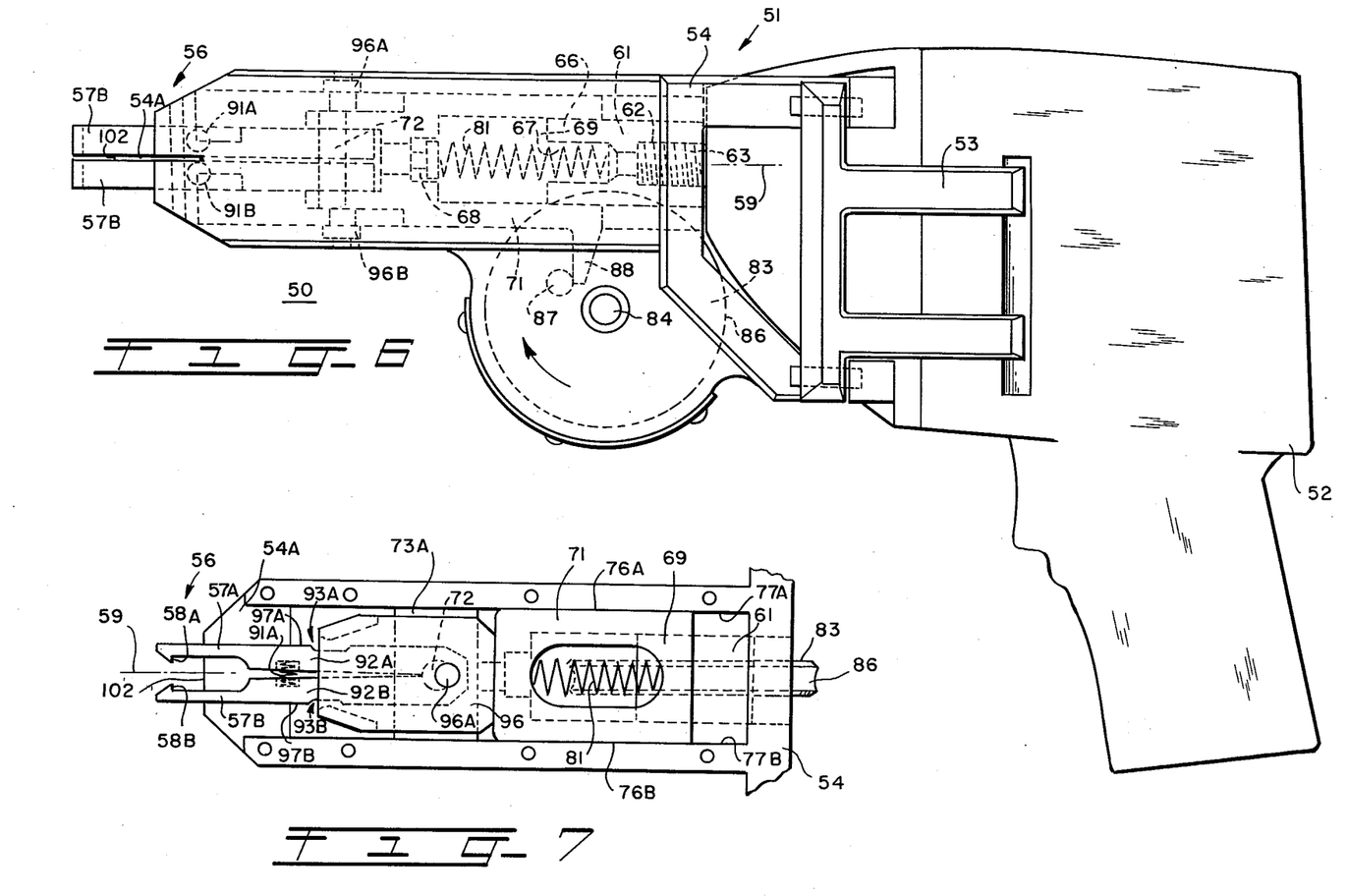
FIG. 6 is a side elevational view of a power-operated, wire lead and solder removal tool which constitutes a second embodiment of the invention.
FIG. 7 is a plan view of a forward portion of the tool of FIG. 6, illustrating additional features of the tool.

Turning now to FIG. 6 of the drawing, a power-operated, wire lead and solder removal tool 50, which constitutes a second embodiment of the invention, is illustrated. The tool 50 includes a frame structure 51 associated with, or further including, a conventional drive mechanism, e.g., a power-operated drill 52, in similar manner to the relationship between the frame structure 11 and the power-operated drill 12 with respect to the tool 10 of the first embodiment. The power-operated drill 52 differs from the power-operated drill 12 in that the drill 52 is of a type which provides single-directional spindle rotation, e.g., a Rockwell Model 476, ⅜-inch portable drill.

Figure 8:
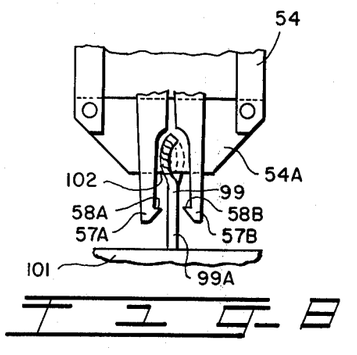
FIG. 8 is an enlarged illustration of part of the tool as depicted in FIG. 7, showing forward ends of a pair of scrapers and of a central plate, interacting with a two lug terminal projecting from a base member.

The frame structure 51 of the tool 50 includes a number of mounting brackets 53 (only one shown) and a main frame member 54 (see also FIG. 7), the mounting brackets 53 serving to secure the main frame member 54 to the housing of the power-operated drill 52. The main frame member 54 extends axially forward, i.e., leftwardly in FIGS. 6 and 7, from the housing of the power-operated drill 52 to a front end 56 of the tool 50, terminating in a central plate 54A (see also FIG. 8). Two pairs of scrapers 57A and 57B surround the central plate 54A, with one pair of the scrapers 57A and 57B being located above, and the other pair below, the central plate 54A, and with both pairs of scrapers 57A and 57B extending partly forward of the central plate 54A. The two pairs of scrapers 57A and 57B, as will be discussed hereinafter, are mounted both for axial movement toward and away from the front end 56 of the tool 50 while surrounding the central plate 54A, and for independent pivotal movement to permit the scrapers 57A and 57B to follow the irregular contours of two dissimilarly bent, terminal lugs.

Each of the scrapers 57A (see also FIG. 12) and 57B includes a scraping edge 58A or 58B. Each scraping edge 58A is located along a portion of a scraper 57A which faces generally radially inwardly toward a longitudinal axis 59 of the tool 50 and a cooperating scraping edge 58B of an associated scraper 57B.

Figure 9:
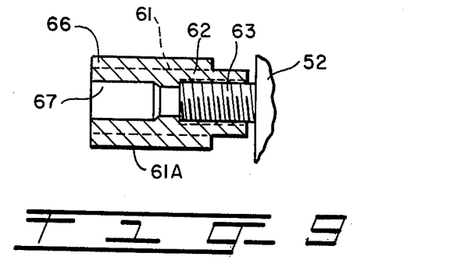
FIG. 9 is a side elevational view, in section along a vertical, central plane, of a worm which forms part of the tool, with FIG. 9 also showing a forward portion of an associated, power-operated drill.

A mechanism for moving the two pairs of scrapers 57A and 57B axially of the tool 50, i.e., parallel to the longitudinal axis 59, will next be described. Such mechanism includes a worm 61 (FIG. 9) having a worm thread 61A extending axially along its periphery. The worm 61 includes a rearward portion 62 which fits over a spindle 63 of the power-operated drill 52. The worm 61 is screwed on to the spindle 63.

Figure 11:
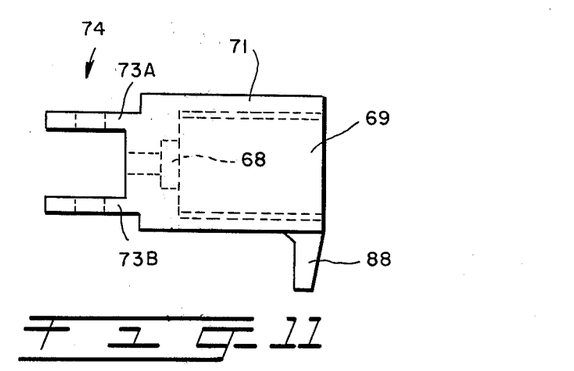
FIG. 11 is a side elevational view of a scraper carrier which is driven by the worm wheel assembly of FIGS. 10A and 10B.

A forward portion 66 of the worm 61 includes an axially extending recess 67 which is aligned axially with a small ball bearing 68 (FIGS. 6 and 11) bordering a rearwardly-opening portion 69 of a scraper carrier 71. Such axial alignment is advantageously maintained by receipt of the forward portion 66 of the worm 61 within the rearwardly-opening portion 69 of the scraper carrier 71 (FIG. 6). The two pairs of scrapers 57A and 57B are carried by, and independently pivotable about, a pivot pin 72 (FIGS. 6, 7 and 12) which passes through a pair of laterally spaced, axially extending bars 73A and 73B (FIG. 11) which together constitute a forward portion 74 of the scraper carrier 71. The scraper carrier 71 includes flat side surfaces 76A and 76B (FIG. 7) which are adapted to slide, respectively, against two fixed, flat, inner surfaces 77A and 77B of the main frame member 54. The scraper carrier 71 is constrained against rotation about the longitudinal axis 59 of the tool 50 by virtue of such sliding engagement between the various flat surfaces.

One end of a compression spring 81 (FIGS. 6 and 7), which extends between the worm 61 and the ball bearing 68, passing through the recess 67 in the worm 61 and the rearwardly-opening portion 69 of the scraper carrier 71, is fixed to an innermost surface of the recess in worm 61. The compression spring 81 serves to bias the scraper carrier 71 axially forward, toward the left in FIGS. 6 and 7 of the drawing, thrusting the scrapers 57A and 57B toward fully extended positions of each. The spring 81 is free to rotate with the worm 61 due to the use of the ball bearing 68 on the scraper carrier 71 as a thrust-receiving member at a forward end of the spring 81. A suitable stop (not shown) is provided to limit the forward travel of the scraper carrier 71 under the influence of the spring 81.

Figure 10A:
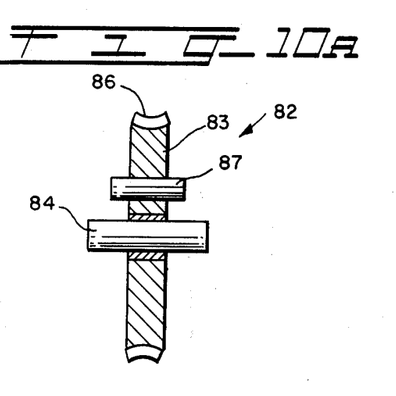
FIGS. 10A and 10B are end elevational and side elevational views, respectively, of a worm wheel assembly with teeth which engage the worm of FIG. 9, FIG. 10A being partly in section along a vertical plane.
Figure 10B:
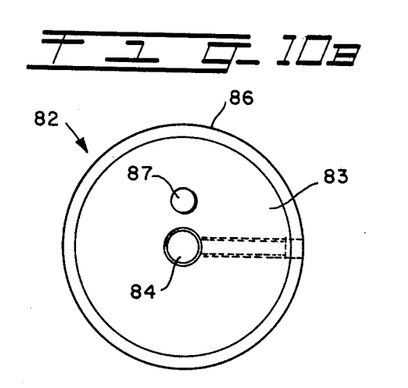

A worm wheel assembly 82 (FIGS. 10A and 10B) includes a wheel 83 which is mounted for rotation on a shaft 84 (see also FIG. 6) supported by the frame structure 51 of the tool 50. The wheel 83 has a toothed circumference 86 which is maintained in engagement with the worm 61, such that the toothed wheel 83 is rotated about the shaft 84 upon the rotation of the worm 61 with the spindle 63 of the power-operated drill 52. The worm wheel assembly 82 also includes a drive pin 87 which projects laterally to both sides (FIG. 10A) from the toothed wheel 83. The drive pin 87 is aligned (FIG. 6) so as to engage a pair of projecting fingers 88 (only one shown) on the scraper carrier 71 (see also FIG. 11), one located adjacent to each side of the toothed wheel 83, during a portion of the rotation of the toothed wheel 83. The rotation of the toothed wheel 83, due to the single-directional rotational capability of the power-operated drill 52, will occur only in a clockwise direction as seen in FIGS. 6 and 10B of the drawing. Thus, during a portion of each such clockwise rotation of the toothed wheel 83, the drive pin 87 will engage the fingers 88 on the scraper carrier 71, at both sides of the toothed wheel 83, and will move the scraper carrier 71 linearly, in a rearward or rightward direction as seen in FIG. 6, while compressing the spring 81, until the rotation of the toothed wheel 83 causes the orbitally moving drive pin 87 to become disengaged from the fingers 88. As a result of such movement of the scraper carrier 71, the scrapers 57A and 57B will initially be moved from a forwardmost, fully extended position of each to a rearwardmost, withdrawn position of each, after which, upon release of the fingers 88 by the drive pin 87, the compression spring 81 will cause the scrapers 57A and 57B to be returned to their fully extended positions.

A compression spring 91A or 91B (FIGS. 6 and 7) extends between a recess 90 (FIG. 12) in each scraper 57A and a similar recess in each associated scraper 57B along a central portion 92A (FIG. 12) or 92B of the respective scraper 57A or 57B, biasing or urging the respective scraper central portions 92A and 92B apart. Since the biasing action occurs on the same side of the pivot pin 72 as the scraping edges 58A and 58B of the respective scrapers 57A and 57B, the springs 91A and 91B serve to bias the facing scraping edges 58A and 58B generally radially outwardly, i.e., with the facing, scraping edges 58A and 58B urged apart.

A laterally indented region 93A (FIG. 12) or 93B (FIG. 7) is located along the respective central portion 92A or 92B of each scraper 57A or 57B. With the scrapers 57A and 57B in a fully extended position of each, as shown in FIG. 7, the compression springs 91A and 91B will be effective to force the respective scraping edges 58A and 58B of each pair of scrapers 57A and 57B generally radially outwardly, away from one another. At this time, a peak of a camming surface 94A or 94B (FIG. 13), located on one or the other of two camming members 96 (only one shown), will be in engagement with a respective one of the laterally indented regions 93A or 93B. Each of the camming members 96 is mounted for pivotal movement about one or the other of two pivot pins 96A and 96B (FIGS. 6, 7 and 13), the pivot pins 96A and 96B passing through supporting plates (not shown) extending across the main frame member 54. The engagement of each laterally indented region 93A or 93B with a camming surface 94A or 94B prevents any further generally radially outward movements of the scrapers 57A and 57B under the influence of the springs 91A and 91B. With the scrapers 57A and 57B not located in their fully extended positions, but rather withdrawn rightward from the positions shown in FIGS. 6 and 7 of the drawing, each of the camming surfaces 94A and 94B (FIG. 13) of the camming members 96 will engage a flat, axially-extending follower surface 97A or 97B (FIGS. 7 and 12), located ahead of a sloping foward end, such as the sloping forward end 98A shown in FIG. 12, of each laterally indented region 93A or 93B on each respective scraper 57A or 57B. The camming surfaces 94A and 94B will force the scraping edges 58A and 58B of each pair of scrapers 57A and 57B generally radially inwardly, toward one another, while overcoming the outward biasing force of the compression springs 91A and 91B. The pivotal mounting of the two camming members 96 separately on the respective pivot pins 96A and 96B will permit independent pivotal movements of the two pairs of scrapers 57A and 57B so that each pair of scraping edges 58A and 58B may independently follow the irregular contours of a terminal, e.g., a terminal with two dissimilarly bent lugs.

The operation of the tool 50 will next be described. The two pairs of scrapers 57A and 57B are initially taken to be in a fully extended position, i.e., with the scraper carrier 71 and the pivot pin 72, upon which the two pairs of scrapers 57A and 57B are independently mounted, thrust forward along the longitudinal axis 59 of the tool 50, toward the left in FIGS. 6 and 7 of the drawing, by the spring 81. The outward biasing force of the springs 91A and 91B (FIG. 13) on each pair of scrapers 57A and 57B causes the associated scraping edges 58A and 58B to be pivoted radially outwardly, away from one another. Thus, the tool 50 may readily be manipulated to position the two pairs of scrapers 57A and 57B axially along a terminal, such as the two lug terminal 99 shown in FIG. 8 of the drawing, which projects transversely from a connector block or terminal board 101, with the separated scraping edges 58A and 58B extending beyond one or more soldered wire leads, e.g., two wire leads, located on the terminal 99, to a flat portion 99A of the terminal 99 located beneath the wire leads. The central plate 54A, disposed at the forward end of the main frame member 54 between the two pairs of scrapers 57A and 57B includes a flat, forward-facing surface 102 for bearing axially against a flat, centrally located, rearward-facing surface of the two lug terminal 99 over which the scrapers 57A and 57B are placed.

The power-operated drill 52 is now energized, in conventional manner, rotating the spindle 63, and with it the worm 61, in such direction as to rotate the threaded wheel 83 clockwise as seen in FIGS. 6 and 10B of the drawing. Thus, the drive pin 87 engages the fingers 88 which project from both sides of the scraper carrier 71, forcing the scraper carrier 71, the pivot pin 72 and the scrapers 57A and 57B to move linearly rearwardly, i.e., toward the right in FIGS. 6 and 7, with continuing rotation of the threaded wheel 83, as the spring 81 is compressed.

Figure 12:
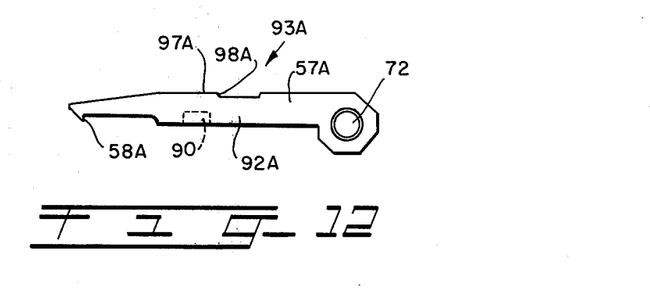
FIG. 12 is a plan view of one of four scrapers which are mounted, as two pairs of associated scrapers, on a pivot pin carried by the scraper carrier of FIG. 11, with FIG. 12 also showing the pivot pin.
Figure 13:
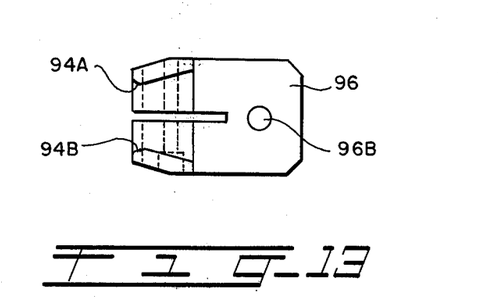
FIG. 13 is a plan view of one of two pivotally-mounted, camming members which include camming surfaces for engaging follower surfaces on the two pairs of scrapers.

The rearward movement of the two pairs of scrapers 57A and 57B initially causes the sloping forward ends, such as the sloping forward end 98A shown in FIG. 12, of each laterally indented region 93A or 93B to traverse the associated camming surface 94A or 94B (FIG. 13) on one or the other of the pivotally-mounted, camming members 96. Thus, the associated scrapers 57A and 57B are pivoted generally radially inwardly about the pivot pin 72, being displaced toward one another as the springs 91A and 91B are compressed. The camming surfaces 94A and 94B are next engaged by the respective follower surfaces 97A and 97B on the rearwardly-moving scrapers 57A and 57B, maintaining the associated scrapers 57A and 57B pivoted toward one another and causing the respective scraping edges 58A and 58B to be forced against the surfaces of the terminal 99, with the camming members 96 pivoting about the respective pivot pins 96A and 96B in response to pivotal movements of the two pairs of scrapers 57A and 57B occasioned by the irregular contours of the terminal 99. The two, axially moving pairs of scraping edges 58A and 58B each function independently to scrape the wire leads and solder cleanly off a different one of the two dissimilarly bent, terminal lugs, in similar manner to the previously-described scraping operation performed by the tool 10. The engagement of the forward-facing tool surface 102 (FIGS. 6, 7 and 8) with a rearward-facing surface of the terminal 99 prevents axial movement of the terminal and the base member during the scraping operation effected by the scrapers 57A and 57B.

With the wire leads and solder now removed, continuing clockwise rotation of the threaded wheel 83 (FIGS. 6 and 10B) causes the drive pin 87 to orbit out of engagement with the fingers 88 on the scraper carrier 71. The compression spring 81 thereupon returns the scraper carrier 71 to the fully extended position which has been discussed previously, with the associated scrapers 57A and 57B pivoted open by the springs 91A and 91B. The power-operated drill 52 may now be de-energized, permitting the axial emplacement of the two pairs of scrapers 57A and 57B upon another terminal in order to perform another wire lead removal operation.

It is to be understood that the described tools are simply illustrative of two embodiments of the invention. Although neither such embodiment includes solder-heating facilities, in order to avoid generating noxious or otherwise objectionable fumes, it is quite possible to add such facilities where desired in order to provide assistance in performing wire lead removal operations. Moreover, although two different means have been disclosed for preventing axial movement of the terminal and base member with the scrapers during scraping operations, one having been disclosed with respect to each of the two embodiments, either (or neither) of such means might be used in connection with either of the two embodiments. Further, where flat terminals are to be scraped, a single pair of scrapers may be employed in place of the two pairs of scrapers used for the terminals described heretofore. Many other modifications may, of course, be made in accordance with the principles of the invention.

What is claimed is:

1. A tool for removing at least one wire lead from a terminal with a plurality of surfaces, the tool comprising:
   a plurality of scrapers, each including a scraping edge;
   means, so mounting said plurality of scrapers that each scraping edge faces a scraping edge of an associated scraper, for moving said plurality of scrapers linearly between an extended position and a withdrawn position thereof;
   means, urging said facing scraping edges of said plurality of scrapers apart, and responsive to said plurality of scrapers moving into said extended position thereof, for separating said facing scraping edges of said scrapers, such that the plurality of scrapers may readily be positioned axially along the terminal beyond at least one wire lead thereon; and
   means, urging said facing scraping edges of said plurality of scrapers toward one another, and responsive to said plurality of scrapers moving away from said extended position thereof, for so displacing said facing scraping edges toward one another as to engage said scraping edges firmly with said plurality of surfaces of the terminal upon axial movement of said plurality of scrapers toward said withdrawn position thereof during operation of said moving means, thereby scraping the wire lead or leads axially off the terminal.

2. A tool as set forth in claim 1, wherein said moving means comprise:
   means for so pivotally mounting said plurality of scrapers as each to pivot independently in order to follow any irregular contours of a terminal engaged during the operation of said moving means and said displacing means.

3. A tool as set forth in claim 2, wherein said plurality of scrapers comprises two pairs of scrapers, and wherein said moving means comprise:
   means for pivotally mounting said two pairs of scrapers independently of one another such that each pair of scrapers may follow a different, irregularly-contoured terminal engaged during the operation of said moving means and said displacing means.

4. A tool as set forth in claim 2, wherein the engaged terminal is one of a plurality of terminals in a common base member, the tool further comprising:
   a frame mounting said moving means, said separating means and said displacing means, said frame including at least one surface positioned to bear axially against a surface of at least one terminal in said base member other than the engaged terminal during the operation of said moving means.

5. A tool as set forth in claim 2, further comprising:

a frame mounting said moving means, said separating means and said displacing means, said frame including a surface positioned to bear axially against a surface of the engaged terminal during the operation of said moving means.

6. A tool as set forth in claim 1, wherein said moving means comprise:
means, including a linearly movable element coupled to said plurality of scrapers, for converting the rotary motion of an output shaft of a rotary drive mechanism into linear motion of said linearly movable element.

7. A tool as set forth in claim 6, further comprising:
a rotary drive mechanism including an output shaft coupled to said moving means.

8. A tool as set forth in claim 7, wherein:
said rotary drive mechanism rotates said output shaft alternatively in either of two directions of rotation; and
said moving means comprise means, effective upon rotation of said rotary drive mechanism in one of said two directions, for so operating said linearly movable element as to move said plurality of scrapers linearly toward said extended position thereof, and effective upon rotation of said rotary drive mechanism in the other of said two directions, for so operating said linearly movable element as to move said plurality of scrapers linearly toward said withdrawn position thereof.

9. A tool as set forth in claim 7, wherein:
said rotary drive mechanism rotates said output shaft in only a single direction of rotation; and
said moving means comprise means for converting the single direction, rotary motion of the output shaft of the rotary drive mechanism into reciprocating motion of said linearly movable element.

10. A tool as set forth in claim 7, wherein said rotary drive mechanism comprises a power-operated drill.

11. A tool for removing at least one wire lead from a terminal with a plurality of surfaces, the tool comprising:
a plurality of scrapers, each including a scraping edge;
a rotary drive mechanism including an output shaft;
means, including a linearly movable element, for converting the rotary motion of the output shaft of said rotary drive mechanism into linear motion of said linearly movable element;
means, coupling the linearly movable element of said motion converting means to said plurality of scrapers and rendered effective upon operation of said rotary drive mechanism, for moving said plurality of scrapers linearly between an extended position and a withdrawn position thereof, said moving means so mounting said plurality of scrapers that each scraping edge faces a scraping edge of an associated scraper;
means, urging said facing scraping edges of said plurality of scrapers apart, and responsive to said plurality of scrapers moving into said extended position thereof, for separating said facing scraping edges of said scrapers, such that the plurality of scrapers may readily be positioned axially along the terminal beyond at least one wire lead thereon; and
means, urging said facing scraping edges of said plurality of scrapers toward one another, and responsive to said plurality of scrapers moving away from said extended position thereof, for so displacing said facing scraping edges toward one another as to engage said scraping edges firmly with said plurality of surfaces of the terminal upon axial movement of said plurality of scrapers toward said withdrawn position thereof during operation of said rotary drive mechanism, thereby scraping the wire lead or leads axially off the terminal.

12. A tool as set forth in claim 11 wherein:
said rotary drive mechanism rotates said output shaft alternatively in either of two directions of rotation; and
said motion converting means comprise means, effective upon rotation of said rotary drive mechanism in one of said two directions, for so operating said linearly movable element as to cooperate with said moving means to move said plurality of scrapers linearly toward said extended position thereof, and effective upon rotation of said rotary drive mechanism in the other of said two directions, for so operating said linearly movable element as to cooperate with said moving means to move said plurality of scrapers linearly toward said withdrawn position thereof.

13. A tool as set forth in claim 11, wherein:
said rotary drive mechanism rotates said output shaft in only a single direction of rotation; and
said motion converting means comprise means for converting the single direction, rotary motion of the output shaft of the rotary drive mechanism into reciprocating motion of said linearly movable element.

14. A tool as set forth in claim 11, wherein said moving means comprise:
means for so pivotally mounting said plurality of scrapers as each to pivot independently in order to follow any irregular contours of a terminal engaged during the operation of said rotary drive mechanism and said displacing means.

15. A tool as set forth in claim 14, wherein said plurality of scrapers comprises two pairs of scrapers, and wherein said moving means comprise:
means for pivotally mounting said two pairs of scrapers independently of one another such that each pair of scrapers may follow a different, irregularly-contoured terminal engaged during the operation of said rotary drive means and said displacing means.

16. A tool as set forth in claim 14, wherein the engaged terminal is one of a plurality of terminals in a common base member, the tool further comprising:
a frame mounting said rotary drive mechanism, said motion converting means, said moving means, said separating means and said displacing means, said frame including at least one surface positioned to bear axially against a surface of at least one terminal in said base member other than the engaged terminal during the operation of said rotary drive mechanism.

17. A tool as set forth in claim 14, further comprising:
a frame mounting said rotary drive mechanism, said motion converting means, said moving means, said separating means and said displacing means, said frame including a surface positioned to bear axially against a surface of the engaged terminal during the operation of said rotary drive mechanism.

18. A tool for removing at least one wire lead from a terminal with a plurality of surfaces, the tool comprising:
   a plurality of scrapers, each including a scraping edge;
   pivotal support means for so mounting said plurality of scrapers that each scraper may be pivoted independently to displace the scraping edge thereof between a generally radially inward position of said scraping edge for engaging, and following any irregular contour of, an associated surface of the terminal, and a generally radially outward position of said scraping edge for not so engaging said associated surface of the terminal;
   a rotary drive mechanism including an output shaft;
   means, including a linearly movable element coupled to said pivotal support means, for converting rotary motion of the output shaft of said rotary drive mechanism into linear motion of said linearly movable element so as to move said pivotal support means, and said plurality of scrapers mounted thereon, linearly between an extended position and a withdrawn position of said plurality of scrapers;
   camming means, operative upon said plurality of scrapers in said extended position thereof, for pivoting said plurality of scrapers about said pivotal support means into said generally radially outward position of each scraping edge, thereby so separating said scraping edges that the plurality of scrapers may readily be positioned axially along the terminal beyond at least one wire lead thereon; and
   spring means, biasing said plurality of scrapers to pivot about said pivotal support means toward said generally radially inward position of each scraping edge and effective in other than said extended position of said plurality of scrapers, for engaging said scraping edges firmly with said plurality of surfaces of the terminal as said plurality of scrapers is moved axially toward said withdrawn position thereof upon operation of said rotary drive mechanism, so as to scrape the wire lead or leads axially off the terminal.

19. A tool as set forth in claim 18, wherein:
   said rotary drive mechanism rotates said output shaft alternatively in either of two directions of rotation; and
   said motion converting means comprise means, effective upon rotation of said rotary drive mechanism in one of said two directions, for so operating said linearly movable element as to move said pivotal support means linearly toward said extended position of said plurality of scrapers, and effective upon rotation of said rotary drive mechanism in the other of said two directions, for so operating said linearly movable element as to move said pivotal support means linearly toward said withdrawn position of said plurality of scrapers.

20. A tool for removing at least one wire lead from a terminal with a plurality of surfaces, the tool comprising:
   a plurality of scrapers, each including a scraping edge;
   pivotal support means for so mounting said plurality of scrapers that each scraper may be pivoted independently to displace the scraping edge thereof between a generally radially inward position of said scraping edge for engaging, and following any irregular contour of, an associated surface of the terminal, and a generally radially outward position of said scraping edge for not so engaging said associated surface of the terminal;
   a rotary drive mechanism including an output shaft;
   means, including a linearly movable element coupled to said pivotal support means, for converting rotary motion of the output shaft of said rotary drive mechanism into linear motion of said linearly movable element so as to move said pivotal support means, and said plurality of scrapers mounted thereon, linearly between an extended position and a withdrawn position of said plurality of scrapers;
   spring means, operative upon said plurality of scrapers in said extended position thereof, for pivoting said plurality of scrapers about said pivotal support means into said generally radially outward position of each scraping edge, thereby so separating said scraping edges that the plurality of scrapers may readily be positioned axially along the terminal beyond at least one wire lead thereon; and
   camming means, mounted for pivotal movement while forcing said plurality of scrapers to pivot about said pivotal support means toward said generally radially inward position of each scraping edge against the bias of said spring means and effective in other than said extended position of said plurality of scrapers, for engaging said scraping edges firmly with said plurality of surfaces of the terminal as said plurality of scrapers is moved axially toward said withdrawn position thereof upon operation of said rotary drive mechanism, so as to scrape the wire lead or leads axially off the terminal.

21. A tool as set forth in claim 20, wherein:
   said rotary drive mechanism rotates said output shaft in only a single direction of rotation; and
   said motion converting means comprise means for converting the single direction, rotary motion of the output shaft of said rotary drive mechanism into reciprocating motion of said linearly movable element.

* * * * *